United States Patent
Marder (10) Patent No.: US 10,552,787 B2
(45) Date of Patent: Feb. 4, 2020

(54) STORE PLANOGRAM TO IMAGE REGISTRATIONS

(71) Applicant: International Business Machines Corporation, Armonk, NY (US)

(72) Inventor: Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 15/256,570

(22) Filed: Sep. 4, 2016

(65) Prior Publication Data

US 2018/0068256 A1     Mar. 8, 2018

(51) Int. Cl.
*G06Q 10/08* (2012.01)
*G06T 7/73* (2017.01)

(52) U.S. Cl.
CPC .............. *G06Q 10/087* (2013.01); *G06T 7/73* (2017.01); *G06T 2207/10004* (2013.01)

(58) Field of Classification Search
None
See application file for complete search history.

(56) References Cited

U.S. PATENT DOCUMENTS

| | | | |
|---|---|---|---|
| 8,941,645 B2 | 1/2015 | Grimaud | |
| 2011/0011936 A1 | 1/2011 | Morandi et al. | |
| 2012/0022913 A1* | 1/2012 | Volkmann | G06Q 10/087 705/7.29 |
| 2015/0088703 A1* | 3/2015 | Yan | G06F 3/147 705/28 |
| 2015/0123973 A1* | 5/2015 | Larsen | G06T 15/04 345/427 |
| 2017/0178060 A1* | 6/2017 | Schwartz | G06K 9/4604 |
| 2017/0178227 A1* | 6/2017 | Graham | G06Q 30/0643 |

FOREIGN PATENT DOCUMENTS

EP     2672445     12/2013

OTHER PUBLICATIONS

Emanuele Frontoni et al., "Embedded Vision Sensor Network for Planogram Maintenance in Retail Environments", Sensors (Basel). Sep. 2015; 15(9): 21114-21133, Published online Aug. 27, 2015.

\* cited by examiner

*Primary Examiner* — Fateh M Obaid
(74) *Attorney, Agent, or Firm* — Gregory J. Kirsch (57) ABSTRACT

Embodiments of the present invention may provide automated techniques for checking store shelves for compliance with planograms that can handle unknown arrangements in a uniform way, with little user involvement, and with relatively low processing complexity. For example, a computer-implemented method for determining compliance with a planogram may comprise receiving at least one image of a plurality of shelves containing objects, receiving at least one planogram representing desired positions of the objects on the shelves, wherein each row of the planogram corresponds to one shelf, adjusting positions of objects in the planogram to reflect a size of the shelves, determining a tolerance for inaccuracy in object position in the image using object dimension data, detecting object positions in the image, aligning each row of the planogram individually to the detected object positions, and comparing the detected object positions with the adjusted planogram positions to generate compliance information.

15 Claims, 4 Drawing Sheets

STORE PLANOGRAM TO IMAGE REGISTRATIONS

BACKGROUND

The present invention relates to automated techniques for checking store shelves for compliance with planograms by automatically performing planogram to image registrations.

Large retail stores, or chains with a number of stores, typically have an interest in properly arranging their stock on their shelves, counters, and displays in accordance with various business and marketing factors. Such arrangements may significantly increase sales over other arrangements. Typically, such stores will develop what is known as a planogram. A planogram is a schematic diagram that illustrates in detail where every product in a retail store should be placed. These schematics typically present a flow chart for the particular merchandise departments within a store layout and also show the aisle and shelf where an item is located.

Typically, stores want to closely follow their shelf stocking compliance because of the various business and marketing factors. Conventionally, it was necessary to have people visually check for such compliance, using printouts of planograms. This is a time-consuming and inefficient way to check compliance.

More recently, automated techniques for checking store shelves for compliance with planograms have arisen. However, there are a number of problems with such automated techniques. For example, object detection itself may difficult, but the comparison of the detected objects to the planogram (the expected positions) is also difficult. The planograms may be poorly defined, with inaccurate geometric information on the placement of objects. Shelves may be poorly stacked, or the wrong shelf may be stacked. Conventional automated techniques typically handle such inconsistencies with the model registrations poorly. A need arises for techniques that can handle the unknown arrangements that are typical in a uniform way, with little user involvement, and with relatively little processing complexity.

SUMMARY

Embodiments of the present invention may provide automated techniques for checking store shelves for compliance with planograms that can handle unknown arrangements in a uniform way, with little user involvement, and with relatively low processing complexity.

For example, in an embodiment of the present invention, a computer-implemented method for determining compliance with a planogram may comprise receiving at least one image of a plurality of shelves containing objects, receiving at least one planogram representing desired positions of the objects on the shelves, wherein each row of the planogram corresponds to one shelf, adjusting positions of objects in the planogram to reflect a size of the shelves, determining a tolerance for inaccuracy in object position in the image using object dimension data, detecting object positions in the image, aligning each row of the planogram individually to the detected object positions, and comparing the detected object positions with the adjusted planogram positions to generate compliance information.

In an embodiment, aligning each row of the planogram individually to the detected object positions may comprise for each row in the planogram: searching for detected objects, for each detected object: performing consensus voting on the object, determining a detection confidence value for the object based on the tolerance for inaccuracy in object position, and scaling the consensus vote according to the detection confidence value. Aligning each row of the planogram individually to the detected object positions may further comprise for detected objects having low detection confidence values, aligning the detected objects using predetermined adjustment values. The comparing may comprise comparing the aligned detected objects having low detection confidence values and the detected objects having high detection confidence values with the adjusted planogram positions and generating compliance information representing a level of compliance of the detected object positions with the planogram. The generated compliance information may comprise summary information. The generated compliance information may comprise identifications of objects that are not positioned in accordance with the planogram.

For example, in an embodiment of the present invention, a computer program product for determining compliance with a planogram may comprise a non-transitory computer readable storage having program instructions embodied therewith, the program instructions executable by a computer, to cause the computer to perform a method comprising receiving at least one image of a plurality of shelves containing objects, receiving at least one planogram representing desired positions of the objects on the shelves, wherein each row of the planogram corresponds to one shelf, adjusting positions of objects in the planogram to reflect a size of the shelves, determining a tolerance for inaccuracy in object position in the image using object dimension data, detecting object positions in the image, aligning each row of the planogram individually to the detected object positions and comparing the detected object positions with the adjusted planogram positions to generate compliance information.

For example, in an embodiment of the present invention, a system for determining compliance with a planogram may comprise a processor, memory accessible by the processor, and computer program instructions stored in the memory and executable by the processor to perform receiving at least one image of a plurality of shelves containing objects, receiving at least one planogram representing desired positions of the objects on the shelves, wherein each row of the planogram corresponds to one shelf, adjusting positions of objects in the planogram to reflect a size of the shelves, determining a tolerance for inaccuracy in object position in the image using object dimension data, detecting object positions in the image, aligning each row of the planogram individually to the detected object positions and comparing the detected object positions with the adjusted planogram positions to generate compliance information.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide automated techniques for checking store shelves for compliance with planograms that can handle unknown arrangements in a uniform way, with little user involvement, and with relatively low processing complexity.

Figure 1:
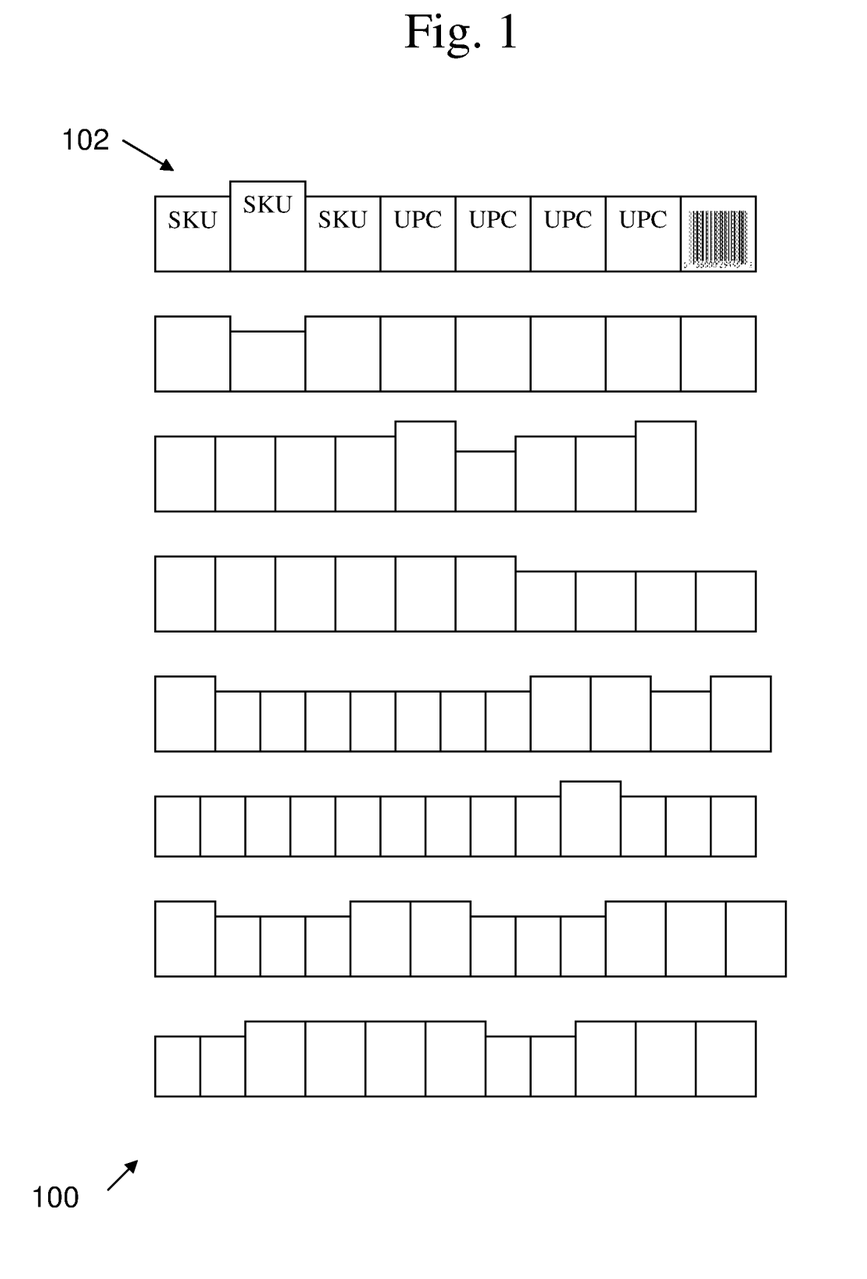
FIG. 1 is an exemplary diagram of a typical store planogram or other object placement diagram.

An example of a typical store planogram 100 or other object placement diagram is shown in FIG. 1. Planogram 100 may include a representation of physical placement of objects on shelves, along with identifiers of the objects 102, such as stock keeping unit (SKUs) numbers, Universal Product Code (UPC) numbers, barcodes, or other standard or proprietary identifiers of the objects. Issues that may arise with the actual placement of objects, relative to the planogram, may include issues such as objects that are on the correct shelf, but in the wrong position on the shelf, shelves that have swapped position, unknown distances between shelves, objects that have been removed and replaced in incorrect positions, etc.

Figure 2:
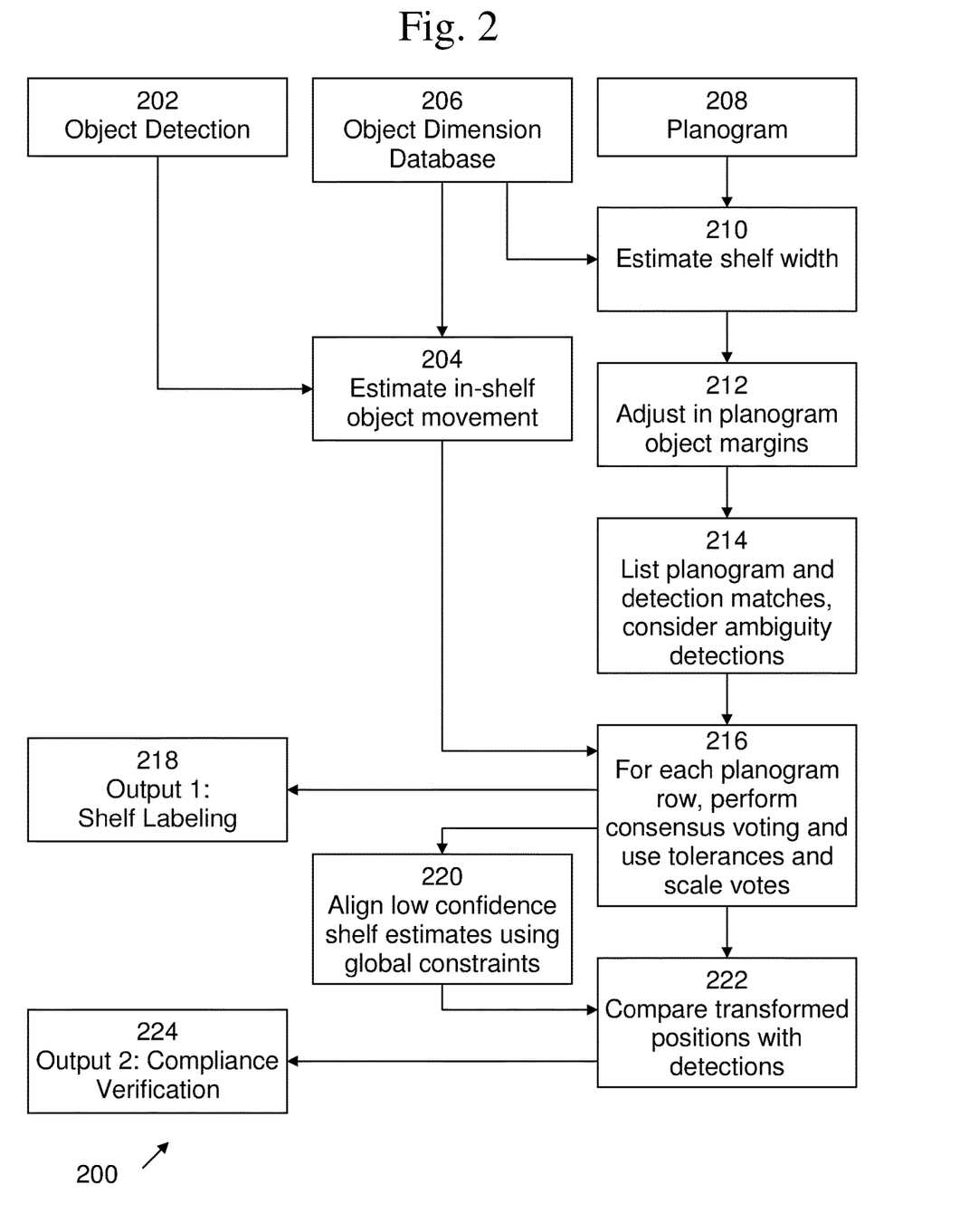
FIG. 2 is an exemplary flow diagram of a process according to an embodiment of the present invention.

An exemplary flow diagram of a process 200 according to an embodiment of the present invention is shown in FIG. 2. It is best viewed in conjunction with FIG. 3, which illustrates the processing that may be performed. Process 200 begins with 202, in which objects on shelves may be detected. This may be done, for example, by photographing shelves 302 with objects in place and processing the images to detect and identify the objects that are present. At 204, the in-shelf object movement may be estimated. As objects are moved, for example, by customers purchasing products, the initial model of object placement on the shelves may become incorrect. Using information from object dimension database 206, an estimate of how much each object can move may be determined, for example, in depth, and also in the image domain. In addition, the tolerance to position-inaccuracy of the object in the shelf may be controlled according to the object dimensions. For example, objects for which instances have been removed may now be positioned deeper in the shelf and therefore may appear to be higher or lower than the shelf. The tolerance for such inaccuracies may be determined from the objects dimensions from object dimension database 206.

Figure 3:
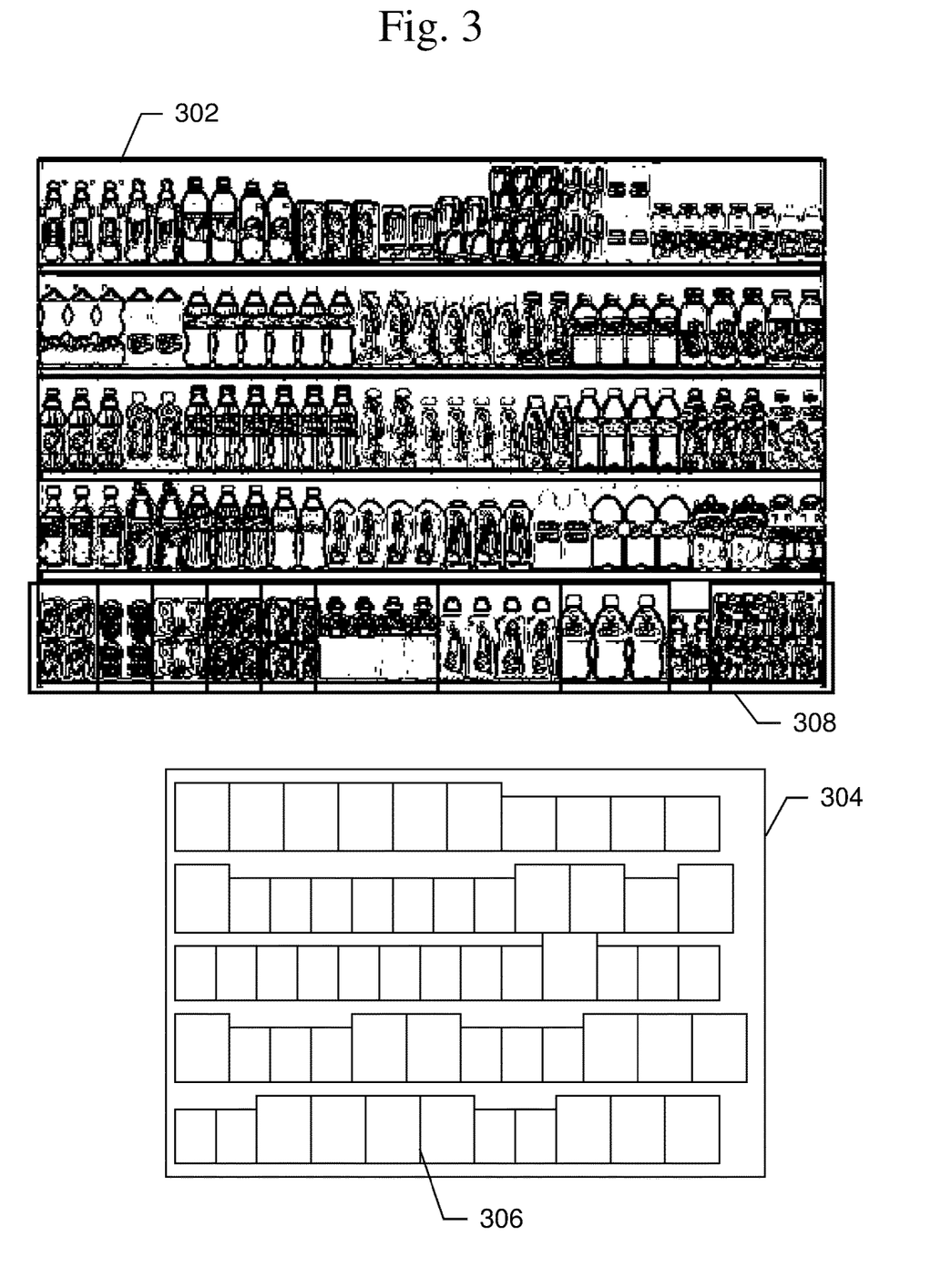
FIG. 3 is an exemplary diagram of processing that may be performed according to an embodiment of the present invention.

At 208, a planogram 304 of the relevant area or position may be defined or received. At 210, estimates of the width of each shelf in the planogram may be determined using information from object dimension database 206. At 212, in-planogram object margins 306 or dimensions may be adjusted. For example, typical planograms may be incomplete or incompletely defined. Further, in the planogram, all objects in a shelf are typically aligned to the left and thus different shelves may appear as having different lengths, though in the store the shelves are of the same size. Accordingly, the margins or dimensions of objects in the planogram may be adjusted, for example, by adjusting the objects to fit rectangular shapes, as indicated by the information from object dimension database 206, and by spacing the planogram objects to reflect shelf size.

At 214, object detection matches and planogram matches may be compiled and listed. In addition, ambiguity detections—detection of ambiguous objects—may also be compiled. For example, anticipated product deviations from the straight shelf model of the planogram may be estimated. In the set of detected objects, the arrangement of objects in rows is typically vague. However, in the planogram, the arrangement of objects in rows is generally quite clear. To compensate for this, the rows of the planogram may be individually aligned to the detected object positions.

To align the rows of the planogram to the detected object positions, the planogram may be registered 308 to the image by iterating row by row in the planogram against the list of detected objects. Accordingly, at 216, the planogram may be searched, row by row, for detected objects. For example, for each detected object, consensus voting on the detections of the objects may be performed using a model having, for example, four degrees of freedom. Tolerances of objects and positions of objects according to the estimated in-shelf object movement, as determined in 204, may be used to determine detection confidence values. The consensus votes may then be scaled according the detection confidence values. At this point, information 218 relating to positioning of individual shelves may be output, and may be in the form of information representing the shelf labeling.

At 220, low-confidence shelf position estimates may be aligned using global constraints, such as minimum and maximum object sizes, shelf sizes and spacing, etc. For example, bundle adjustments may be performed on low-confidence shelf detections. At 222, the higher confidence detected positions from 218 and the aligned lower-confidence detected positions from 220 may be compared with adjusted planogram positions to determine the compliance of the detected objects with the planogram. For example, the planogram may be compared to the detected objects using the individual row adjustments that have been made. Information 224 representing the level of compliance of the detected object positions with the planogram may be output. Information 224 may include general or summary information, such as percentages of objects that are positioned in accordance with the planogram, and may in addition, or instead, include detailed information, such as identifications of objects that are not positioned in accordance with the planogram, etc.

Figure 4:
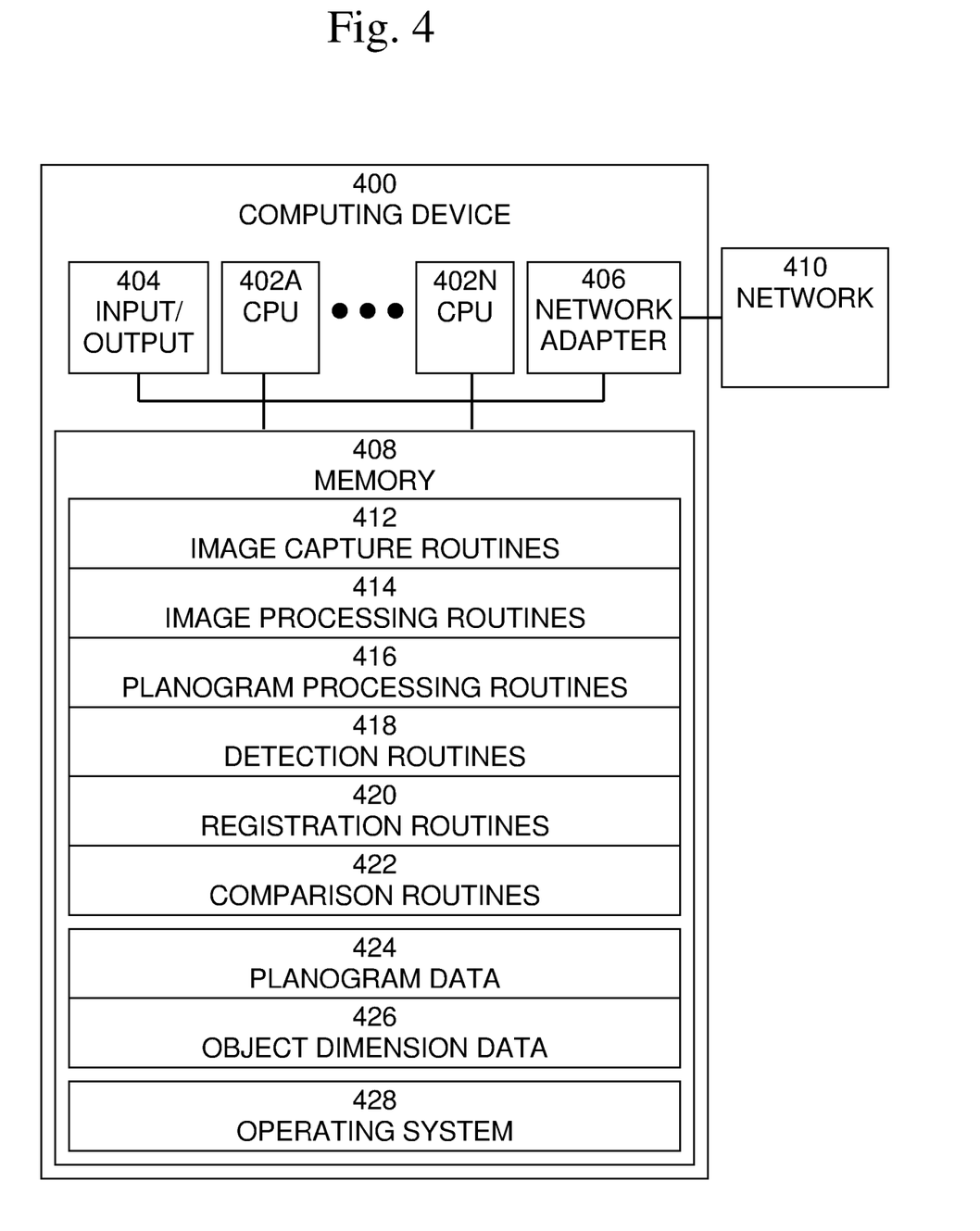
FIG. 4 is an exemplary block diagram of a computer system in which processes involved in the embodiments described herein may be implemented.

An exemplary block diagram of a computer system 400, in which processes involved in the embodiments described herein may be implemented, is shown in FIG. 4. Computer system 400 is typically a programmed general-purpose computer system, such as an embedded processor, system on a chip, personal computer, workstation, server system, and minicomputer or mainframe computer. Computer system 400 may include one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present invention also contemplates embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc.

Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. For example, as shown in FIG. 1, computer systems may perform a variety of roles in the system, method, and computer program product described herein. For example, computer systems may perform one or more roles as end devices, gateways/base stations, application provider servers, and network servers. In the example shown in FIG. 4, exemplary memory contents are shown representing routines and data for all of these roles. However, one of skill in the art would recognize that these routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 4, memory 408 may include image capture routines 412, image processing routines 414, planogram processing routines 416, detection routines 418, comparison routines 420, registration routines 422, planogram data 424, object dimension data 426, and operating system 428. For example, image capture routines 412 may include routines to capture images of object placement. Image processing routines 414 may include routines to process the captured images to detect and identify the objects that are present and to estimate the in-shelf object movement using object dimension data 422. Planogram processing routines 416 may include routines to use planogram data 420 to adjust object margins or dimensions. Detection routines 418 may include routines to compile and list object detection matches and planogram matches, estimate anticipated product deviations from the straight shelf model of the planogram, etc. Comparison routines 420 may include routines to compare detected positions with adjusted planogram positions to determine the compliance of the detected objects with the planogram. Registration routines 422 may include routines to register the planogram to the image. Operating system 428 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for determining positions of physical objects implemented in a computer comprising a processor, memory accessible by the processor, and computer program instructions stored in the memory and executable by the processor, the method comprising:

capturing, with a photographic device, at least one image of a plurality of physical shelves containing physical objects, and transmitting the at least one image to the computer system;

receiving, at the computer system, the at least one image;

detecting, by computer program instructions executed by the processor, physical objects shown in the at least one image and positions of the physical objects shown in the at least one image;

determining, by computer program instructions executed by the processor, estimates of movement of the detected physical objects from an initial placement of the physical objects;

determining, by computer program instructions executed by the processor, a tolerance for inaccuracy in physical object position in the at least one image using physical object dimension data;

receiving, at the computer system, at least one planogram representing desired positions of the physical objects on the shelves, wherein each row of the planogram corresponds to one shelf;

adjusting, by computer program instructions executed by the processor, margins or dimensions of objects shown in the planogram using physical object dimension data and adjusting positions of physical objects in the planogram to reflect a size of the physical shelves;

detecting, by computer program instructions executed by the processor, matches between physical objects shown in the planogram and physical objects shown in at least one image;

aligning, by computer program instructions executed by the processor, each row of the planogram individually to the determined positions of physical objects shown in the at least one image by, for each row in the planogram: searching for detected objects, for each detected object, performing consensus voting on the object, determining a detection confidence value for the object based on the tolerance for inaccuracy in object position, and scaling the consensus vote according to the detection confidence value;

outputting, from the computer system, shelf labeling information indicating shelf positions of the physical objects shown in the at least one image;

determining, by computer program instructions executed by the processor, differences between the determined physical object positions and the adjusted planogram positions to generate compliance information representing a level of compliance of the detected object positions with the planogram.

2. The method of claim 1, wherein aligning each row of the planogram individually to the detected object positions further comprises:

for detected objects having low detection confidence values, aligning the detected objects using predetermined adjustment values.

3. The method of claim 2, wherein the determining the differences comprises:

comparing the aligned detected objects having low detection confidence values and the detected objects having high detection confidence values with the adjusted planogram positions; and generating the compliance information representing a level of compliance of the detected object positions with the planogram.

4. The method of claim 3, wherein the generated compliance information comprises summary information.

5. The method of claim 3, wherein the generated compliance information comprises identifications of objects that are not positioned in accordance with the planogram.

6. A computer program product for determining positions of physical objects, the computer program product comprising a non-transitory computer readable storage having program instructions embodied therewith, the program instructions executable by a computer, to cause the computer to perform a method comprising:

capturing, with a photographic device, at least one image of a plurality of physical shelves containing physical objects, and transmitting the at least one image to the computer system;

receiving, at the computer, the at least one image;

detecting, at the computer, physical objects shown in the at least one image and positions of the physical objects shown in the at least one image;

determining, at the computer, estimates of movement of the detected physical objects from an initial placement of the physical objects;

determining, at the computer, a tolerance for inaccuracy in physical object position in the at least one image using physical object dimension data;

receiving, at the computer system, at least one planogram representing desired positions of the physical objects on the shelves, wherein each row of the planogram corresponds to one shelf;

adjusting, at the computer, margins or dimensions of objects shown in the planogram using physical object dimension data and adjusting positions of physical objects in the planogram to reflect a size of the physical shelves;

detecting, at the computer, matches between physical objects shown in the planogram and physical objects shown in at least one image;

aligning, at the computer, each row of the planogram individually to the determined positions of physical objects shown in the at least one image by, for each row in the planogram: searching for detected objects, for each detected object, performing consensus voting on the object, determining a detection confidence value for the object based on the tolerance for inaccuracy in object position, and scaling the consensus vote according to the detection confidence value;

outputting, from the computer system, shelf labeling information indicating shelf positions of the physical objects shown in the at least one image;

determining, at the computer, differences between the determined physical object positions and the adjusted planogram positions to generate compliance information representing a level of compliance of the detected object positions with the planogram.

7. The computer program product of claim 6, wherein aligning each row of the planogram individually to the detected object positions further comprises:

for detected objects having low detection confidence values, aligning the detected objects using predetermined adjustment values.

8. The computer program product of claim 7, wherein the determining the differences comprises:

comparing the aligned detected objects having low detection confidence values and the detected objects having high detection confidence values with the adjusted planogram positions; and generating the compliance information representing a level of compliance of the detected object positions with the planogram.

9. The computer program product of claim 8, wherein the generated compliance information comprises summary information.

10. The computer program product of claim 8, wherein the generated compliance information comprises identifications of objects that are not positioned in accordance with the planogram.

11. A system for determining positions of physical objects, the system comprising a processor, memory accessible by the processor, and computer program instructions stored in the memory and executable by the processor to perform:

capturing, with a photographic device, at least one image of a plurality of physical shelves containing physical objects, and transmitting the at least one image to the computer system;

receiving, at the system, the at least one image;

detecting, at the system, physical objects shown in the at least one image and positions of the physical objects shown in the at least one image;

determining, at the system, estimates of movement of the detected physical objects from an initial placement of the physical objects;

determining, at the system, a tolerance for inaccuracy in physical object position in the at least one image using physical object dimension data;

receiving, at the computer system, at least one planogram representing desired positions of the physical objects on the shelves, wherein each row of the planogram corresponds to one shelf;

adjusting, at the system, margins or dimensions of objects shown in the planogram using physical object dimension data and adjusting positions of physical objects in the planogram to reflect a size of the physical shelves;

detecting, at the system, matches between physical objects shown in the planogram and physical objects shown in at least one image;

aligning, at the system, each row of the planogram individually to the determined positions of physical objects shown in the at least one image by, for each row in the planogram: searching for detected objects, for each detected object, performing consensus voting on the object, determining a detection confidence value for the object based on the tolerance for inaccuracy in object position, and scaling the consensus vote according to the detection confidence value;

outputting, from the computer system, shelf labeling information indicating shelf positions of the physical objects shown in the at least one image;

determining, at the system, differences between the determined physical object positions and the adjusted planogram positions to generate compliance information representing a level of compliance of the detected object positions with the planogram.

12. The system of claim 11, wherein aligning each row of the planogram individually to the detected object positions further comprises:
   for detected objects having low detection confidence values, aligning the detected objects using predetermined adjustment values.

13. The system of claim 12, wherein the determining the differences comprises:
   comparing the aligned detected objects having low detection confidence values and the detected objects having high detection confidence values with the adjusted planogram positions; and
   generating the compliance information representing a level of compliance of the detected object positions with the planogram.

14. The system of claim 13, wherein the generated compliance information comprises summary information.

15. The system of claim 13, wherein the generated compliance information comprises identifications of objects that are not positioned in accordance with the planogram.

* * * * *